United States Patent
Melen et al.

(10) Patent No.: US 9,628,454 B2
(45) Date of Patent: Apr. 18, 2017

(54) SIGNALLING DELEGATION IN A MOVING NETWORK

(75) Inventors: Jan Melen, Espoo (FI); Jukka Ylitalo, Espoo (FI); Pekka Nikander, Jorvas (FI); Petri Jokela, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 120 days.

(21) Appl. No.: 12/526,857

(22) PCT Filed: Feb. 12, 2007

(86) PCT No.: PCT/EP2007/051346
§ 371 (c)(1),
(2), (4) Date: Oct. 30, 2009

(87) PCT Pub. No.: WO2008/098611
PCT Pub. Date: Aug. 21, 2008

(65) Prior Publication Data
US 2010/0106972 A1    Apr. 29, 2010

(51) Int. Cl.
*H04L 9/32*    (2006.01)
*H04W 80/04*    (2009.01)
(Continued)

(52) U.S. Cl.
CPC .......... *H04L 63/06* (2013.01); *H04L 63/0823* (2013.01); *H04W 12/04* (2013.01);
(Continued)

(58) Field of Classification Search
CPC ..... H04L 63/06; H04L 63/08; H04L 63/0823; H04W 12/04; H04W 12/06; H04W 80/00; H04W 80/04
(Continued)

(56) References Cited

U.S. PATENT DOCUMENTS

2002/0080752 A1 * 6/2002 Johansson et al. ............ 370/338
2003/0084293 A1 * 5/2003 Arkko et al. ................. 713/168
(Continued)

FOREIGN PATENT DOCUMENTS

EP    0111430 A    6/1986
EP    1411430 A2 *    4/2004
(Continued)

OTHER PUBLICATIONS

Moskowitz et al., Host Identity Protocol draft-ietf-hip-base-04, Internet Engineering Task Force (Dec. 24, 2005).*
(Continued)

*Primary Examiner* — Theodore C Parsons
(74) *Attorney, Agent, or Firm* — Rothwell, Figg, Ernst & Manbeck, P.C.

(57) ABSTRACT

In order to delegate location update signaling responsibility from a Mobile Node to a Mobile Router, the Mobile Router is provided with a second symmetric key generated by a Mobile Node using a first symmetric key shared between the Mobile Node and a Peer Node. The Mobile Router is additionally provided with a "certificate" authenticating the second symmetric key using the first symmetric key. In this way, the mobile router can sign location update related messages sent to the Peer Node with the second symmetric key, and can provide the Peer Node with the certificate in order to allow the Peer Node to authenticate the right of the Mobile Router to act on behalf of the Mobile Node.

24 Claims, 6 Drawing Sheets

```
{
      HI-MN ; HI-PEER ;
      HMAC {
              HMAC-key-index;
              Action;
              Lifetime
      } K_{MN-PEER}
}
```

(51) Int. Cl.
*H04L 12/04* (2006.01)
*H04L 12/06* (2006.01)
*H04L 9/08* (2006.01)
*H04L 29/06* (2006.01)
*H04W 12/04* (2009.01)
*H04W 80/00* (2009.01)
*H04W 12/06* (2009.01)

(52) U.S. Cl.
CPC ........... *H04W 12/06* (2013.01); *H04W 80/00* (2013.01); *H04W 80/04* (2013.01)

(58) Field of Classification Search
USPC .................................. 713/171; 380/259, 273
See application file for complete search history.

(56) References Cited

U.S. PATENT DOCUMENTS

| | | | | |
|---|---|---|---|---|
| 2003/0190046 | A1* | 10/2003 | Kamerman et al. | 380/286 |
| 2003/0206637 | A1* | 11/2003 | Caronni et al. | 380/277 |
| 2004/0128517 | A1 | 7/2004 | Drews et al. | |
| 2005/0036615 | A1* | 2/2005 | Jakobsson et al. | 380/255 |
| 2005/0156708 | A1* | 7/2005 | Puranik et al. | 340/7.21 |
| 2006/0104252 | A1* | 5/2006 | Song et al. | 370/338 |
| 2006/0282675 | A1* | 12/2006 | Yao | 713/176 |
| 2007/0003062 | A1* | 1/2007 | Mizikovsky et al. | 380/270 |
| 2007/0060127 | A1* | 3/2007 | Forsberg | 455/436 |

FOREIGN PATENT DOCUMENTS

| | | |
|---|---|---|
| JP | 2005210555 A | 8/2005 |
| WO | 9832065 A2 | 7/1998 |
| WO | 0074345 A1 | 12/2000 |
| WO | 03036916 A | 5/2003 |

OTHER PUBLICATIONS

Laganier et al., "HIPernet: A Decentralized Security Infrastructure for Large Scale Grid Environments", IEEE/ACM International Workshop on Grid Computing (Nov. 14, 2005).*
Johnson et al, RFC3775: Mobility Support in IPv6, Internet Engineering Task Force (Jun. 2004).*
Websters New World Dictionary of the American Language, 164 (Warner Books 1984).*
Websters New Collegiate Dictionary, 336 (9th ed 1987).*
Office Action issued on Jun. 2, 2011 in corresponding Mexican Patent Application No. Mx/a/2009/006850, with copy of associate's letter (for English translation), 8 pages.
Japanese Office Action issued in corresponding application on Mar. 19, 2012 (associate's letter translating O.A.), 4 pages.

* cited by examiner

```
Encrypted {
    HI-MN; HI-PEER;
    HI-issuer; HI-subject;
    HMAC-key;
    HMAC {
        HMAC-key-index;
        Action;
        Lifetime
    }$K_{MN-PEER}$
}$K_{issuer-subject}$
```

Figure 4

```
{
    HI-MN ; HI-PEER ;
    HMAC {
        HMAC-key-index;
        Action;
        Lifetime
    }$K_{MN-PEER}$
}
```

SIGNALLING DELEGATION IN A MOVING NETWORK

CROSS REFERENCE TO RELATED APPLICATION

This application is a 35 U.S.C. §371 National Phase Application from PCT/EP2007/051346, filed Feb. 12, 2007, and designating the United States.

TECHNICAL FIELD

The present invention relates to signalling delegation in a moving network and in particular, though not necessarily, to delegation of location update rights from a Mobile Node to a Mobile Router.

BACKGROUND

Figure 1A:
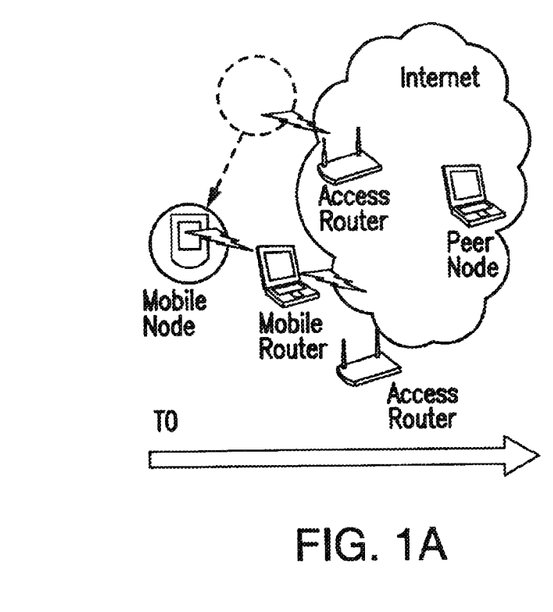
FIG. 1A illustrates schematically a moving wireless network comprising a Mobile Node attached to a Mobile Router.
Figure 1B:
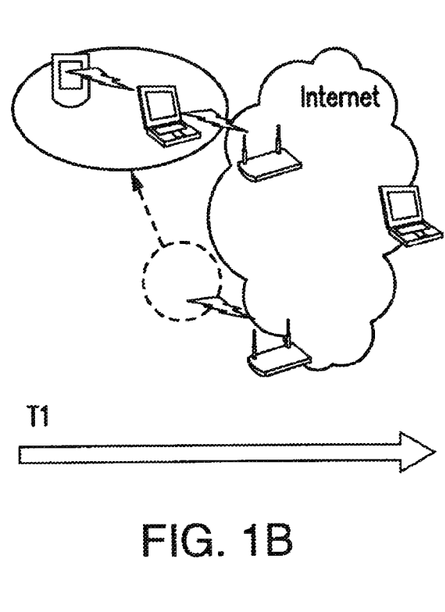
FIG. 1B illustrates the network of FIG. 1A with the Mobile Node having been handed-off to a second Mobile Router.
Figure 1C:
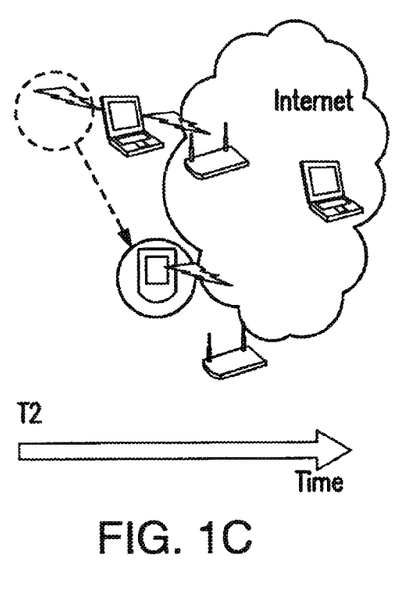
FIG. 1C illustrates the network of FIG. 1A with the Mobile Node having being handed-off to a fixed access router.

Trains, busses, airplanes and Personal Area Networks (PANs) are examples of use cases where moving network technologies can be applied. A moving wireless network is a cluster consisting of Mobile Nodes (MNs) and Mobile Routers (MRs). A Mobile Router routes IP traffic between a Mobile Node and the Internet (or other IP network). The Mobile Router acts as an access point for the Mobile Node. A Mobile Router may be connected to another moving network or directly to the Internet via an access point (AP). In the former case, a set of nested mobile networks results. Figure 1A illustrates a scenario where a Mobile Node is initially attached to a Mobile Router. In FIG. 1B, the Mobile Node is handed-off to a second Mobile Router, whilst in FIG. 1C the Mobile Node is handed-off from the second Mobile Router to a fixed access router.

A Mobile Router broadcasts beacons to advertise its existence and that it provides a mobile routing service. The beacons may contain an operator identifier, for example, to aid selection of an appropriate network by a user. When a Mobile Node finds a suitable Mobile Router, the Mobile Node triggers an attachment exchange with the Mobile Router.

It will be appreciated that when a Mobile Router changes its point of attachment to the Internet, or is handed-off to another Mobile Router, the locations (i.e. IP addresses) of all of the downstream Mobile Nodes will change. In order to maintain service continuity during and after hand-off of a Mobile Router, some mechanism is required in order to ensure that data sent from peer (or correspondent) nodes involved in a communication session with the Mobile Node is sent to the Mobile Node at the node's new location. A number of approaches are possible.

Firstly, the Mobile Node itself can be responsible for notifying the Peer Node(s) of its new location. This approach results however in a large volume of location update related signalling for even relatively small moving networks, and results in relatively long hand-off reaction times. A second approach involves the creation of a tunnel between the Mobile Router and some home router (or "home agent") within the fixed network. All traffic sent from a Peer Node to a Mobile Node (and possibly traffic sent in the reverse direction) is routed through the tunnel. When the Mobile Router changes its location, it sends an update to the home router. Two problems with this approach are the use of sub-optimal (triangular) routing and the increased packet size due to the tunnelling overhead. An example of this second approach is the IETF Network Mobility (NEMO) mechanism. A third approach involves the delegation of signalling rights from the Mobile Nodes to the Mobile Router to allow the Mobile Router to send location update signalling to Peer Nodes on behalf of the Mobile Nodes.

An example of the third approach is described in WO03036916, where a Mobile Node generates an authorisation certificate by signing a public key of the Mobile Router with its own private key. The certificate is then provided to the Mobile Router, which includes the certificate in any location update message it sends on behalf of the Mobile Node. The message is also signed with the private key of the Mobile Router. Using the public keys of the Mobile Router and the Mobile Node, a Peer Node can verify both that the update relates to the claimed Mobile Node and that the Mobile Router is authorised to perform the update on behalf of the Mobile Node. A Mobile Router may further delegate responsibility to another (upstream) Mobile Router by signing the public key of the upstream router with its own private key, adding this to the certificate, and passing the certificate to the upstream router. This approach necessitates however that the Peer Node process a relatively long certificate chain for every received location update.

SUMMARY

It is an object of the present invention to enable delegation of signalling rights in and between moving networks in such a way that the delegated rights can be passed between entities without introducing an excessive processing burden on Peer Nodes. This and other objects are achieved by providing a Mobile Router with a second symmetric key generated by a Mobile Node using a first symmetric key shared between the Mobile Node and a Peer Node. The Mobile Router is additionally provided with a "certificate" authenticating the second symmetric key using the first symmetric key. In this way, the mobile router can sign location update related messages sent to the Peer Node with the second symmetric key, and can provide the Peer Node with the certificate in order to allow the Peer Node to authenticate the right of the Mobile Router to act on behalf of the Mobile Node.

According to a first aspect of the present invention there is provided a Mobile Node arranged in use to communicate with a Mobile Router provisioning a wireless moving network, the Mobile Node comprising:

means for establishing a security association with a Peer Node, said security association comprising a first symmetric key;

means for establishing a security association with said Mobile Router;

means for delegating location update signalling rights for the Mobile Node to the Mobile Router, the means for delegating being arranged to provide the Mobile Router with an authorisation ticket containing a second symmetric key derived from said first symmetric key, and authorisation information identifying said second symmetric key and confirming the authenticity of said second symmetric key using said first symmetric key.

The various means recited above are typically implemented by way of a combination of software and data stored in a memory of the node, and hardware processing means, for example a microprocessor and RF circuitry.

The authorisation information provided to the Mobile Router is not bound to the Mobile Router. The information, or further information derived therefrom, can therefore be passed by the router to another upstream router or other upstream entity and can be freely used by the other router or entity.

Preferably, the Mobile Node is a Host Identity Protocol enabled node, and said means for establishing security associations with the Peer Node and with the Mobile Router are means for establishing Host Identity Protocol security associations. In this case, said first symmetric key is an HMAC key. Said second symmetric key is a further HMAC key derived from the first HMAC key, i.e. first symmetric key. Said authorisation information may comprise a lifetime of said second symmetric key, said second symmetric key, and an HMAC protecting the authorisation information and generated using said first symmetric key. The HMAC is protected with the end-to-end keying material.

Preferably, said authorisation information contains said second symmetric key integrity protected using said first symmetric key. The information may be encrypted using, for example, said first symmetric key. Rather than containing said second symmetric key, the information may contain a pointer to that key, for example in the case where the Mobile Node and the Peer Node share a common codebook, and said pointer is an index to the codebook.

According to a second aspect of the present invention there is provided a Mobile Router for provisioning a wireless moving network to Mobile Nodes, the Mobile Router comprising:

means for establishing a security association with a Mobile Node;

means for receiving from the Mobile Node an authorisation ticket containing a second symmetric key derived from a first symmetric key known to the Mobile Node and to a Peer Node with which the Mobile Node has established a security association, and authorisation information identifying said second symmetric key and confirming the authenticity of said second symmetric key using said first symmetric key;

means for sending a location update message to said Peer Node on behalf of the Mobile Node, the message containing a new location of the Mobile Node and said authorisation information, and a signature generated using said second symmetric key.

The various means recited above are typically implemented by way of a combination of software and data stored in a memory of the node, and hardware processing means, for example a microprocessor and RF circuitry.

The invention is applicable in particular to a Host Identity Protocol enabled router which is arranged in use to communicate with Host Identity Protocol enabled mobile and Peer Nodes. In this case, said first symmetric key is an HMAC key, and said second symmetric key is a further HMAC key.

Preferably, the Mobile Router comprises means for establishing a security association with a further Mobile Router or fixed network side node and for providing said ticket to that router or node, whereby the other router or node can perform location update signalling on behalf of the Mobile Node. Alternatively, the Mobile Router may derive a third symmetric key from said second symmetric key, and replace the second symmetric key in the ticket with the third symmetric key prior to sending the ticket to the further router or node. When sending a Location Update, the further Mobile Router or entity includes in the message the modified authorisation information, and signs the message with the third symmetric key.

According to a third aspect of the present invention there is provided a method of delegating location update signalling rights from a Mobile Node to a Mobile Router provisioning a wireless moving network, the method comprising:

establishing a security association between said Mobile Node and a Peer Node, said security association comprising a first symmetric key;

establishing a security association between said Mobile Node and said Mobile Router;

sending an authorisation ticket from said Mobile Node to said Mobile Router, the ticket containing a second symmetric key derived from said first symmetric key, and authorisation information identifying said second symmetric key and confirming the authenticity of said second symmetric key using said first symmetric key.

When it is necessary for the Mobile Router to send a location update to the Peer Node on behalf of the Mobile Node, the Mobile Router includes with the location update message said authentication information and a signature generated using said second symmetric key. Upon receipt of the message, the Peer Node identifies or obtains the second symmetric key, confirms the authenticity of the second symmetric key using the first symmetric key which is known to it, and authenticates the signature using the second symmetric key.

A preferred implementation of the method employs the Host Identity Protocol. In particular, said security associations are negotiated using the Host Identity Protocol, and said first and second symmetric keys are a first HMAC key and a second HMAC key derived from the first HMAC key. The location update message sent from the Mobile Router to the Peer Node is a Host Identity Protocol Location Update.

DETAILED DESCRIPTION

The IETF document draft-ietf-hip-base-06 titled "Host Identity Protocol" introduces an addressing mechanism which disassociates a host's addressable identity (the "Host Identity") from its physical location (i.e. a routable IP address). A Host Identity is in fact a public key of an asymmetric key pair owned by the host, which allows a host to prove ownership of a Host Identity whilst at the same time providing a means for establishing a secure communication channel between hosts. HIP requires the introduction into the protocol stack of a HIP layer which essentially performs a mapping between Host Identities (or Host Identity Tags HITs derived from Host Identities) and IP addresses. A given host can update its entry in the mapping table of a peer host by sending a Location Update to the peer. The sending host must sign a Location Update with a so-called HMAC key. This key (a "first" symmetric key) represents a shared secret between the hosts, and is determined during the HIP base exchange. The base exchange uses the Diffie-Hellman method as the basis for generating the HMAC key and the keys for the Encapsulating Security Payload (ESP) Security Association.

Figure 2:
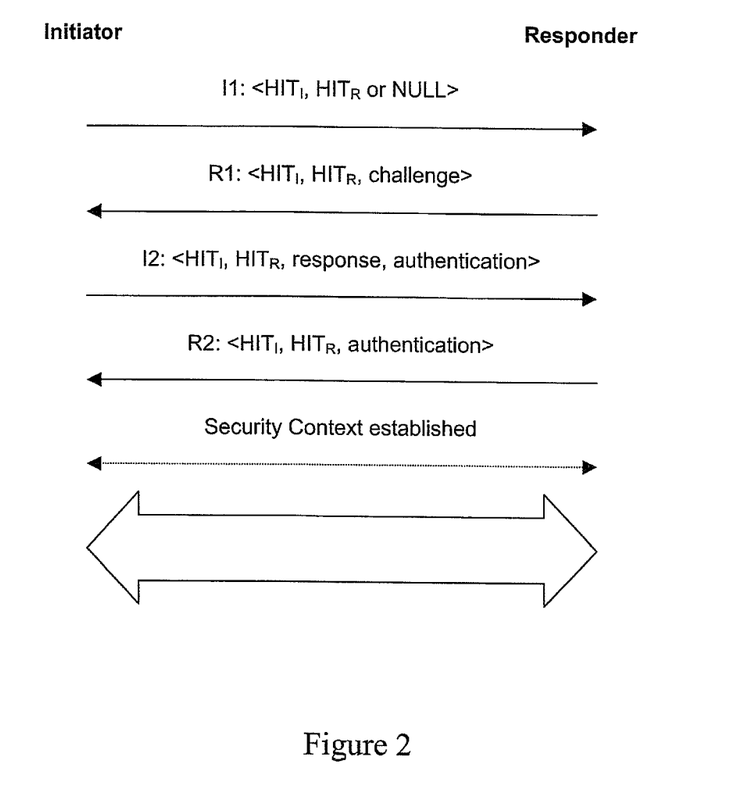
FIG. 2 illustrates the HIP base exchange procedure.
Figure 3:
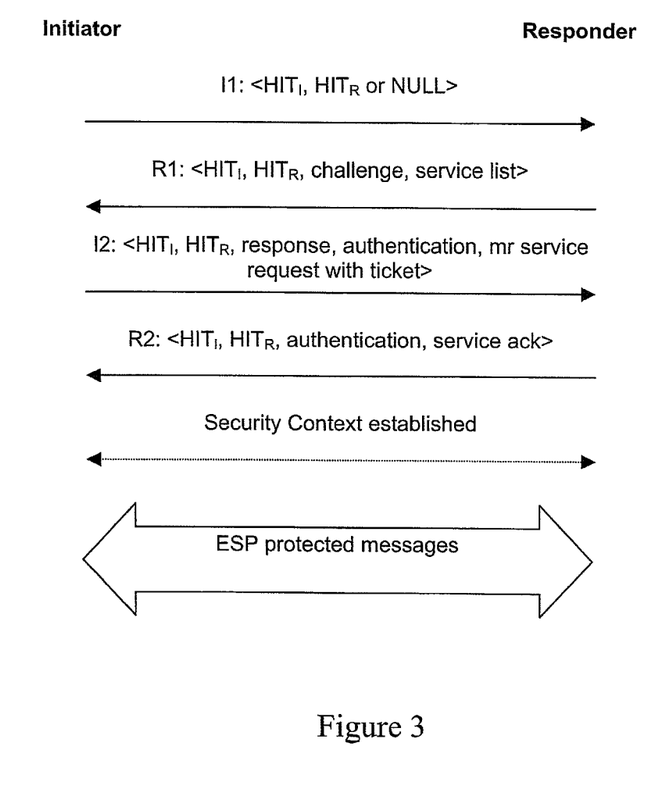
FIG. 3 illustrates the HIP base exchange procedure with registration extension.
Figure 4:
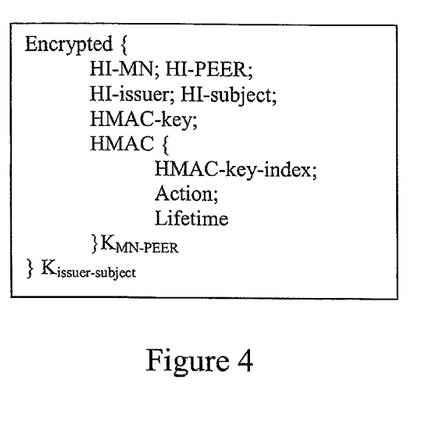
FIG. 4 illustrates an authentication ticket for inclusion in an I2 message of the HIP base exchange with registration extension.

FIG. 2 illustrates the HIP base exchange carried out between a pair of HIP hosts, identified as a Mobile Node and a Peer Node. By way of example, the Mobile Node may be a mobile phone or the like, whilst the Peer Node may also be a mobile phone, or a fixed line user terminal or a network server. IETF draft "Host Identity Protocol (HIP) Registration Extension" (draft-ietf-hip-registration-02) describes an extension (introducing new TLVs) to the HIP base protocol intended to allow registration of a Mobile Node with a Mobile Router. The extended exchange is shown in FIG. 3. Registration related information is included in the exchanged messages. Once registered, the Mobile Node requests a routing service from the Mobile Router. It is proposed here to send a "delegation ticket" from the Mobile Node to the Mobile router as part of the registration extension, protected using the negotiated ESP Security Association. This ticket includes a new HMAC key (a "second" symmetric key) generated by the Mobile node using the keying material shared between the Mobile Node and the Peer Node. The ticket also includes the new HMAC key integrity protected and encrypted using the original HMAC key. As such, the Mobile Router cannot decrypt or modify this authentication information without this being apparent to any Peer Node (see below). As well as the integrity protected HMAC key, the authentication information contained within the ticket may include an authorisation lifetime and/or an authentication type (also integrity protected). FIG. 4 illustrates a posible implementation of the ticket, where the key $K_{MN-PEER}$ is the original HMAC key known only to the Mobile Node and the Peer Node. $K_{issuer-subject}$ is, in the first instance, a key shared between the Mobile Node (the key "issuer") and the Mobile Router (the key "subject"). As the ticket is secured using the Security Association established between the Mobile Node and the Mobile Router, the new HMAC key is not leaked to any third party node.

For a Mobile Node newly registered with a Mobile Router, the Mobile Router must send a Location Update message to all Peer Nodes of the Mobile Node (where HIP associations have already been established between the Mobile Node and these Peer Nodes) identifying the new IP address of the Mobile Router. The Mobile Node will have notified the Mobile Router of the Host Identity Tag/IP address mappings during the base exchange, or these can be learned by the Mobile Router as packets pass through it in transit between the Mobile Node and the Peer Nodes. In the event that the Mobile Node is already attached to the Mobile Router when it attempts to connect to a new Peer Node, the base exchange with the Peer Node is run through and visible to the Mobile Router and the Mobile Router can establish the necessary state information. The Mobile Node also runs a registraton exchange with the Mobile Router to send the new ticket to the Mobile Router. In practice, the Mobile Node and the Mobile Router run the full registration exchange only once, and after establishing a security association between them, the Mobile Node can run an extended HIP update exchange with the Mobile Router. This enhanced three way update exchange includes the new authorization ticket for the Peer Node.

Figure 5:
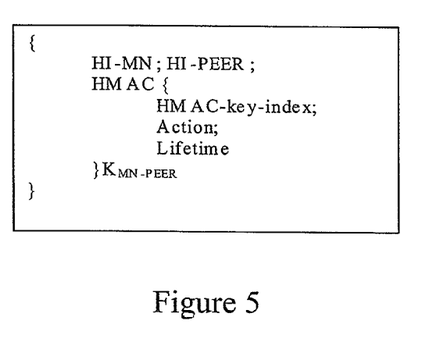
FIG. 5 illustrates authentication information for inclusion in a location update.

Similarly, when the Mobile Router changes its point of attachment (to the Internet), the Mobile Router must send Location Updates to all Peer Nodes associated with Mobile Nodes downstream of the Mobile Router. The Mobile Router signs each Location Update with the appropriate HMAC key for the Mobile Node and the Peer Node (nb. a Mobile Node generates a different HMAC key for each Peer Node). In addition, the Mobile Router includes in the message the unmodified authentication information received from the Mobile Node for that Peer Node, i.e. the integrity protected (and encrypted) HMAC key. This information is illustrated in FIG. 5.

Rather than include the new HMAC key itself in the ticket, the Mobile Node may include only a pointer to such a new key. This may apply where the end-nodes, i.e. the Mobile Node and the Peer Node, generate initially shared keying material (HIP base exchange). The nodes have a lot of bulk keying material (random bytes in practise) that is stored as an array. The Mobile Node may send an index to the array that points to a specific part of the keying material. As a result, the end-nodes are kept in synchrony and they know which part of the keying material to use. In addition, the index, i.e. the pointer, does not reveal anything about the secret keys to outsiders.

The Mobile Router may construct the Location Update message such that it looks like an Update message that would have been sent by the Mobile Node, except for the inclusion of the authentication information and signature by the new HMAC key. In particular, the message may include the HIT of the Mobile Node as the source HIT. However, the message may also include a HIT of the Mobile Router as an additional parameter. This would allow, for example, the Peer Node to identify a different Security Association for use with this communication session. The message must also contain the index value for the HIT association and which is used by the Peer Node to identify the correct keying material, i.e. the original HMAC key. The index value is included in the authorisation ticket provided by the Mobile Node to the Mobile Router.

Upon receipt of a Location Update, a Peer Node must authenticate the right of the Mobile Router to act on behalf of the Mobile Node. It does this by first verifying that the authentication information included with the Update is protected using the original HMAC key, and obtains that key either using a pointer contained in the update or directly (by decrypting the key if contained in the message). The Peer Node then knows whether or not the new HMAC key has been validly issued by the claimed Mobile Node (if the protected data includes only a pointer to a new HMAC key, the Peer Node must obtain or derive the new key). The Peer Node then checks whether or not the message is correctly signed with the new HMAC key, thus authenticating the Mobile Router. Assuming that the new HMAC key and Mobile Router are authenticated, the Peer Node updates its HIP mappings with the new location for the Mobile Node.

To avoid attacks related to the location update exchange, the Peer Nodes must send challenges to the Mobile Node's claimed location (i.e., reachability test). In practice, these challenge messages are destined to the Mobile Router. The Mobile Router on the forwarding path uses the new HMAC key to protect the reply message and sent the message back to the Peer Nodes on behalf of the Mobile Nodes.

It is important to note that no HIP base exchange is conducted between the Mobile Router and the Peer Node. No Security Association (SA) therefore exists between these nodes and no authentication process is conducted. The Peer Node trusts the Mobile Node to send the new HMAC key only to authorised Mobile Routers.

Figure 6:
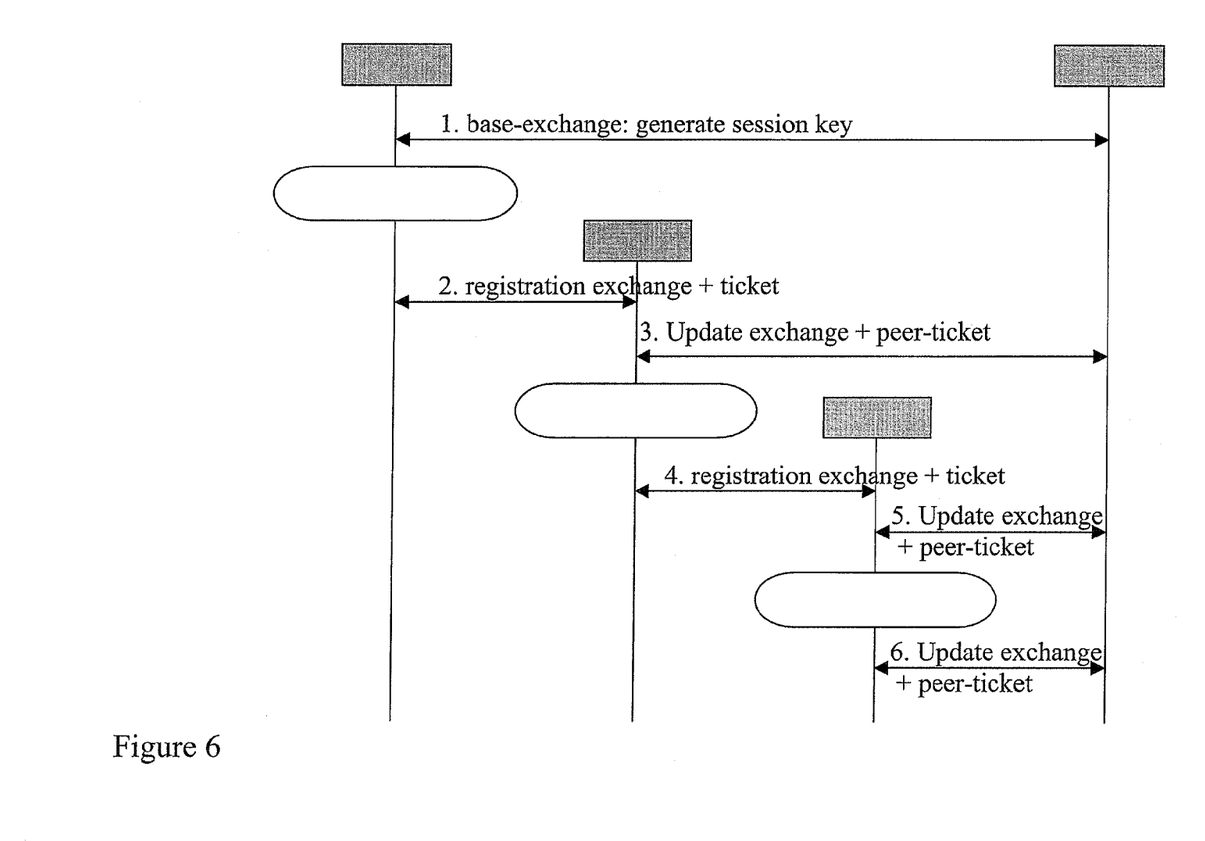
FIG. 6 illustrates the signalling delegation process with sub-delegation from a first Mobile Router to a second Mobile Router.

In the event that the Mobile Router moves behind another Mobile Router, the Routers must perform the HIP base exchange with registration extension. As a result, the upstream Router receives from the downstream Router authentication tickets for all Mobile Nodes that have delegated location update responsibility to the downstream Router. Each ticket contains the original authentication information provided to the downstream Mobile Router by the Mobile Node, and is signed by a key ($K_{issuer-subject}$) shared between the Mobile Routers. The upstream Router can then in turn perform location updates to Peer Nodes based on the information received in these tickets. As there is no association between the peer and the Mobile Router, there is no need to provide any additional information about the previous Mobile Router and the same authentication information can be used by the new Mobile Router for location updates. FIG. 6 illustrates the signalling flow associated with a Mobile Node (MN) first delegating signalling responsibility to a first Mobile Router (MR1), the first Mobile Router subsequently further delegating that responsibility to a second Mobile Router (MR2).

If a Mobile Node moves out of a mobile network, it must revoke the old HMAC key(s). It sends an update message to its Peer Node(s) identifying the keys that are no longer valid. Specifically, this may be done using an enhanced location update message which contains a hash of the revoked HMAC key. After receiving this information, a Peer Node does not accept any new location updates with the revoked key. Subsequently sent Location Updates are signed using the old HMAC key (or a further key if delegation to another Mobile Router occurs).

Considering now the nested moving network case, an extension to the HMAC key generation process makes it possible to revoke keys in the nested Mobile Router case. When a Mobile Router (#1) delegates signalling rights to another upstream Mobile Router (#2), the former does not reveal the initial location update HMAC key (provided by the Mobile Node). Instead, the Mobile Router #1 computes a one-way hash (e.g. SHA256) over the key received from the Mobile Node. The Mobile Router #1 replaces the (new) HMAC key within the ticket received from the Mobile Node, with the hashed key. The ticket still contains however the same authorisation information, namely the new HMAC key protected and encrypted with the original HMAC key. The ticket also includes an indication that the hashed key is the nth key in the hash chain. The modified ticket is sent securely to the second Mobile Router during the base exchange. The second, upstream Mobile Router uses the hashed key to protect its location update messages sent to the Peer Node, these messages also including the (original) authentication information. The Peer Node is able to authenticate the signature by itself decrypting the new HMAC key, and hashing that key (n times) to derive the signing key.

This approach makes it possible for the first Mobile Router to detach from the second Mobile Router and revoke the second Mobile Router's ticket. In other words, each Mobile Router in a nested moving network uses a hash value of a key used by the previous Mobile Router. The Mobile Routers lower in the hierarchy can revoke keys higher in the hierarchy.

Consider for example a key created as follows: MR#3-key=sha256(MR#2-key=sha256(MR#1-key)). Now, if the MR#2 leaves the MR#3 moving network, the former sends a revocation message to the Peer Node. The Peer Node knows that MR#2 key was higher in the key chain. Therefore, MR#2 is allowed to revoke the MR#3-key. As the Peer Nodes will always know the original key, they are able to compute all required hashed key values in the hash chain.

The procedures described above significantly reduce location update related signalling as a Mobile Router acts as a signalling proxy between Mobile Nodes and a Peer Nodes, performing location updates en bloc for all downstream Mobile Node. Moreover, the procedures are simpler to implement and operate than the prior art public-private key pair based certificate approach, as authentication by a Peer Node requires only the authentication of a pair of symmetric key signatures (performed using the old and the new HMAC keys).

Figure 7:
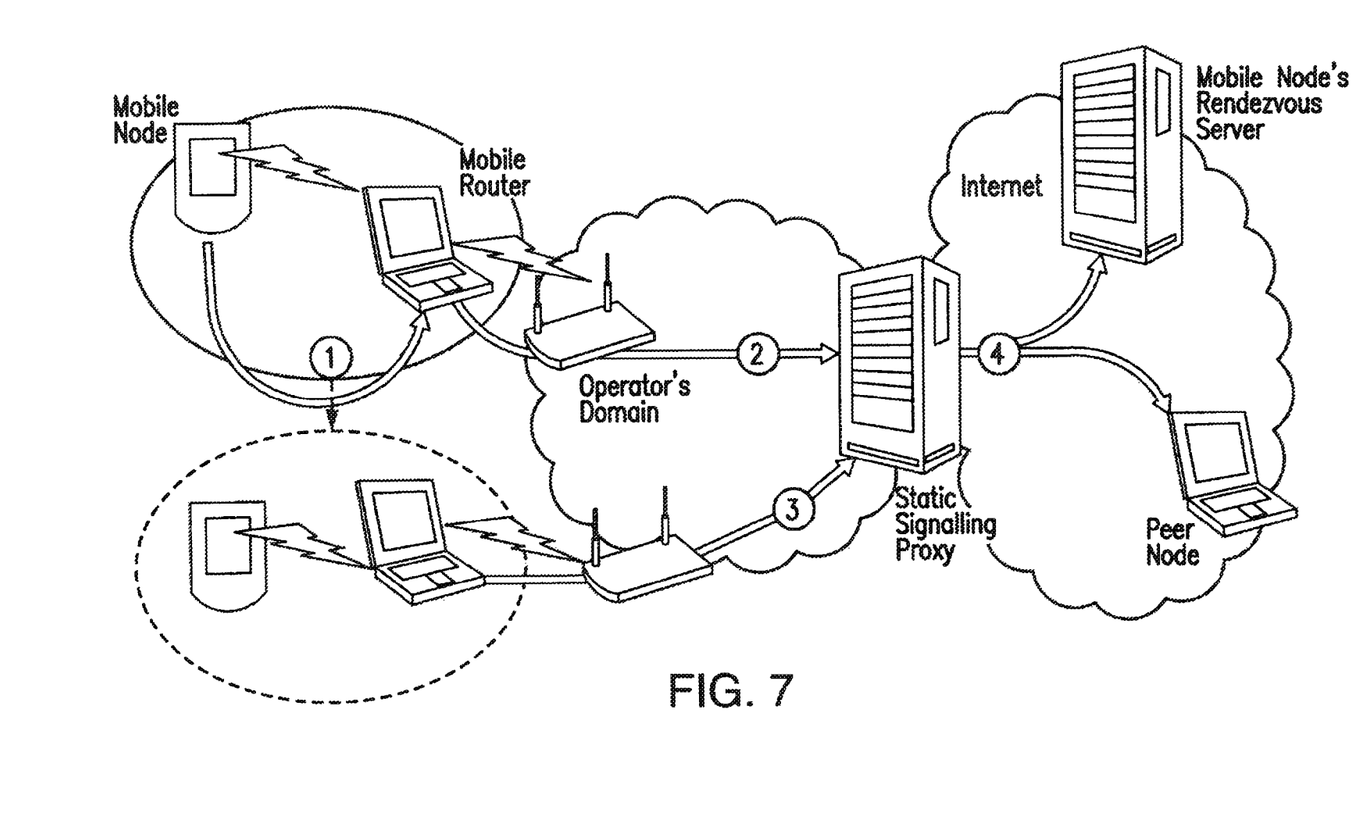
FIG. 7 illustrates use of a static signalling proxy in a fixed network with signalling delegation to the proxy.

In order to optimise the over-the-air signalling between the Mobile Routers and the Internet, a static signalling proxy may be introduced as illustrated in FIG. 7. The Mobile Router registers its clients and delegates the signalling rights to the static signalling proxy located in the fixed network. When the Mobile Router makes a hand-off, it runs a single location update exchange with the static signalling proxy. The Mobile Router's multiplexed address (i.e. the combination of the Router's IP address and some identity such as port number or HIT) may represent the current location of all the clients belonging to the moving network behind it. The static signalling proxy in the fixed network can use the available high bandwidth to send a "burst" of location updates to the Peer Nodes on behalf of the Mobile Nodes. The Peer Nodes send the challenge messages to the multiplexed locator of the Mobile Router if the static signalling proxy is not on the forwarding path in order to verify that the Mobile Nodes are at the location where the static signalling proxy claims them to be. If the static signalling proxy is on the forwarding path, the proxy replies directly to the challenge messages sent by the Peer Nodes.

The procedures described here have some similarities with the prior art Kerberos model for establishing authenticated security associations. Kerberos is described in IETF RFC4120. In particular, the Mobile Node acts like a Key Distribution Center (KDC). However, according to Kerberos, the ticket provided to a client is bound to that client. The Kerberos approach therefore precludes, in a scaleable way, further delegation to an upstream router. In contrast, the approach described here does not bind the ticket to any particular entity and as such can be transferred upstream without approval from the originating Mobile Node.

It will be appreciated by the person of skill in the art that various modifications may be made to the above described embodiments without departing from the scope of the present invention.

The invention claimed is:

1. In a network comprising a mobile node, a peer node, and a mobile router, wherein a first symmetric key is known to both the mobile node and the peer node, a method performed by the mobile router, the method comprising:
  receiving from the mobile node a second symmetric key derived from the first symmetric key, wherein the second symmetric key was not known to the mobile router prior to the mobile router receiving the second symmetric key from the mobile node and the second symmetric key is not bound to the mobile router;

receiving from the mobile node a certificate comprising encrypted information that was encrypted using the first symmetric key;

using the second symmetric key to generate a digital signature; and transmitting to the peer node, on behalf of the mobile node, a set of information comprising: location update information, the certificate, and the digital signature generated using the second symmetric key.

2. The method of claim 1, wherein the second symmetric key was generated by the mobile node.

3. The method of claim 1, wherein said encrypted information comprises the second symmetric key.

4. The method of claim 1, wherein said encrypted information comprises a pointer to the second symmetric key.

5. The method of claim 1, wherein the mobile node generates the second symmetric key using the first symmetric key.

6. The method of claim 1, further comprising:

in response to determining that there exists a certain upstream mobile router, the first mobile router transmits a ticket to the upstream mobile router, wherein the ticket comprises: (a) a third key derived from the second key and (b) information identifying the location of the third key in a hash chain.

7. A mobile router, comprising: a receiver for receiving from a mobile node (1) an authorization ticket, wherein the mobile node shares a first symmetric key with a peer node with which the mobile node has established a security association, the authorization ticket containing a second symmetric key derived from the first symmetric key known to the mobile node and to the peer node, and (2) authorization information identifying said second symmetric key; a data processor operable to use the second symmetric key to sign a location update related message; and a transmitter for sending to said peer node on behalf of the mobile node the signed location update related message together with the authorization information, wherein the data processor is configured such that, in response to a determination that there exists a certain upstream mobile router, the mobile router uses the transmitter to transmit a ticket to the upstream mobile router, wherein the ticket comprises: (a) a third key derived from the second key and (b) information identifying the location of the third key in a hash chain.

8. A method for providing to a peer node location information identifying the current network location of a mobile node, the method comprising:

the mobile node attaching to a mobile router;

after attaching to the mobile router, the mobile node exchanging data with the peer node to determine a first symmetric key; and after determining the first symmetric key, the mobile node authorizing the mobile router to send to the peer node location update messages on the behalf of the mobile node, each of said location update messages comprising information identifying the mobile node's current network location and information for identifying the mobile node, wherein the step of authorizing the mobile router to send to the peer node the location update message comprises the mobile node sending to said mobile router an authorization ticket comprising a second symmetric key generated by the mobile node using said first symmetric key and authorization information comprising information for identifying said second symmetric key and a digital signature created using said first symmetric key.

9. The method of claim 8, further comprising the mobile node generating the digital signature using said first symmetric key and said information for identifying said second symmetric key.

10. The method of claim 9, wherein said information for identifying said second symmetric key comprises a pointer to said second symmetric key.

11. A mobile node arranged to communicate with a mobile router provisioning a wireless moving network, the mobile node being further arranged to:

obtain a first symmetric key, which is shared between the mobile node and a peer node; and authorizing the mobile router to send to the peer node location update messages on the behalf of the mobile node, each of said location update messages comprising information identifying the mobile node's current network location and information for identifying the mobile node, wherein the mobile node is arranged to authorize the mobile router to send to the peer node the location update message on the behalf of the mobile node by, at the least, providing to the mobile router (i) a second symmetric key derived from said first symmetric key and (ii) authorization information identifying said second symmetric key and confirming the authenticity of said second symmetric key using said first symmetric key.

12. The mobile node according to claim 11, wherein the mobile node is a Host Identity Protocol enabled node, and the mobile node is arranged to establish Host Identity Protocol security associations with the peer node and with the mobile router.

13. The mobile node according to claim 11, wherein said first symmetric key is a hash messaged authentication code key.

14. The mobile node according to claim 13, wherein said second symmetric key is a hash messaged authentication code key derived from said first symmetric key.

15. The mobile node according to claim 11, wherein said authorization information comprises: a value representing the lifetime of said second symmetric key and a signature generated using said first symmetric key.

16. The mobile node according to claim 11, wherein said authorization information includes said second symmetric key encrypted using said first symmetric key.

17. The mobile node according to claim 11, wherein said authorization information includes a pointer to said second symmetric key.

18. The mobile node according to claim 11, wherein the mobile node is arranged to encrypt at least part of the authorization information using said first symmetric key prior to providing the authorization information to the mobile router so that the mobile router receives encrypted authorization information.

19. A mobile router, comprising:

a receiver for receiving from a mobile node (1) a first authorization ticket, wherein the mobile node shares a first symmetric key with a peer node with which the mobile node has established a security association, the first authorization ticket containing a second symmetric key derived from the first symmetric key known to the mobile node and to the peer node, and (2) authorization information providing proof that the mobile node has given to the mobile router authorization for the mobile router to send to the peer node location update messages on behalf of the mobile node, each of said location update messages comprising information identifying the mobile node's current network location and information for identifying the mobile node, said authorization information for providing said proof that the mobile router is authorized to act on the behalf of the mobile node comprising first information identifying said second symmetric key and second information generated by the mobile node using the first symmetric key;

a data processor operable to use the second symmetric key to sign a location update related message; and a transmitter for sending to said peer node on behalf of the mobile node the signed location update related message together with the authorization information.

20. The mobile router according to claim 19, wherein the data processor is configured such that, in response to a determination that there exists a certain upstream mobile router, the mobile router uses the transmitter to transmit a second authorization ticket to the upstream mobile router, wherein the second authorization ticket comprises a third key derived from the second key.

21. The mobile router according to claim 20, wherein the second authorization ticket further comprises information identifying the location of the third key in a hash chain.

22. The mobile router according to claim 19, wherein said first symmetric key is a hash messaged authentication code key, and said second symmetric key is a further hash messaged authentication code key.

23. The mobile router according to claim 19, wherein the mobile router is operable to establish a second security association with a further mobile router or fixed network side node and provide said authorization ticket to that further router or fixed network side node, whereby the further router or fixed network side node can perform location update signaling on behalf of the mobile node.

24. The mobile router according to claim 23, wherein the mobile router is further operable to derive a third symmetric key from said second symmetric key, and replace the second symmetric key in the ticket with the third symmetric key prior to sending the ticket to the further router or fixed network side node.

\* \* \* \* \*